(12) United States Patent
Tachner

(10) Patent No.: US 6,560,560 B1
(45) Date of Patent: May 6, 2003

(54) APPARATUS AND METHOD FOR DETERMINING THE DISTANCE BETWEEN TWO POINTS

(76) Inventor: Eric Joshua Tachner, 3852 Hamilton St., Irvine, CA (US) 92614

( * ) Notice: Subject to any disclaimer, the term of this patent is extended or adjusted under 35 U.S.C. 154(b) by 0 days.

(21) Appl. No.: 09/556,384

(22) Filed: Apr. 24, 2000

(51) Int. Cl.$^7$ .............................................. G01B 11/14
(52) U.S. Cl. ..................................................... 702/164
(58) Field of Search ........................ 73/514.01; 33/1 G; 356/15, 4, 5.06, 13.3, 1, 560, 356; 250/237

(56) References Cited

U.S. PATENT DOCUMENTS

| | | | | |
|---|---|---|---|---|
| 4,777,352 A | * | 10/1988 | Moore ........................ 235/404 |
| 4,856,894 A | * | 8/1989 | Anderson ..................... 356/15 |
| 4,874,239 A | * | 10/1989 | Tamura ........................ 356/4 |
| 5,022,751 A | * | 6/1991 | Howard ........................ 356/1 |
| 5,091,869 A | * | 2/1992 | Ingram et al. .............. 364/560 |
| 5,099,116 A | * | 3/1992 | Hoult ..................... 250/237 G |
| 5,430,546 A | * | 7/1995 | Huber ....................... 356/356 |
| 5,493,786 A | * | 2/1996 | Thomson ......................... 33/1 |
| 5,652,651 A | | 7/1997 | Dunne |
| 5,914,775 A | * | 6/1999 | Hargrove et al. .......... 356/3.13 |
| 6,006,021 A | | 12/1999 | Tognazzini |
| 6,023,323 A | * | 2/2000 | Kato et al. ................. 356/5.06 |

* cited by examiner

*Primary Examiner*—John Barlow
*Assistant Examiner*—Douglas N Washburn
(74) *Attorney, Agent, or Firm*—Leonard Tachner

(57) ABSTRACT

Measurement of respective distances to two remote points and measurement of the included angle, permit electronic calculation of the distance between the two remote points such as points on the opposed edges of an interior wall the length or other linear dimension of which is to be measured. The preferred embodiment is implemented using two laser-based pointer devices connected on a common housing through a shaft encoder. Each pointer device has a laser transmitter and detector for determining the distance to selected points at opposite ends of a wall. The angle between the pointers is determined by a shaft encoder as one of the two pointers is rotated from pointing at a first edge of the wall to the point at the second edge while the other of the pointers remains directed toward the first edge.

21 Claims, 4 Drawing Sheets

$$c^2 = a^2 + b^2 \mp 2ab \cos \theta \quad (1)$$

$$c = \sqrt{a^2 + b^2 \; 2ab \cos \theta} \quad (2)$$

APPARATUS AND METHOD FOR DETERMINING THE DISTANCE BETWEEN TWO POINTS

BACKGROUND OF THE INVENTION

1. Field of the Invention

The present invention relates generally to the field of electronic length measuring devices and more specifically, to an apparatus for measuring the distance between two remote points, such as remote ends of a transverse wall in a room interior for determining the length of such a wall.

2. Background Art

The conventional method for determining the length of an interior wall is to simply use a tape measure or the like extended the full length of the wall or to simply "walk off" the distance between the ends of the wall. Using a tape measure is often inconvenient for one individual. Moreover, obstructions such as furniture may prevent convenient placement of the tape measure adjacent or on the wall to be measured. "Walking off" the length of a wall is inherently inaccurate and can also be rendered inconvenient by obstructions adjacent the wall.

Measurement of wall length is a common requirement for real estate agents, carpenters, carpet layers, painters, architects, interior decorators, builders and others who need to know interior wall dimensions in their respective professions. It would be highly advantageous if there were an apparatus for measuring wall length electronically which would obviate the more conventional and less convenient techniques of manual measurement. Solid state lasers have made length measurement far more convenient and practical. By way of example, U.S. Pat. No. 5,652,651 to Dunne discloses a laser range finder for use on a golf course for measuring distances up to 1,000 yards with an accuracy of ±1 yard. Scaling such an apparatus for measuring interior room dimensions of less than 100 feet with an accuracy of ±0.1 feet, would be a simple matter of altering timing devices and pulse widths. Repeating the measurement many times and employing statistical averaging could increase the accuracy to within a fraction of an inch. Unfortunately, even such an electronic distance measuring device would present certain inconveniences. For example, the device would have to be positioned at one end of the wall to be measured and pointed at the opposite end. Moreover, with an accuracy of less than one inch, the device's length would have to be calculated into the length measurement and the position of the device in relation to one end of the wall would be critical. Furthermore, obstructions adjacent or on the wall (i.e., wall hangings) would interfere with the measurement process. It would be far more convenient if such measurement of the length of an interior wall could be accomplished using an electronic length measuring device that is located some distance from the wall during the measurement.

A search of the prior art patents shows that there are disclosures of devices for making interior measurements from a position separated from interior walls. By way of example, U.S. Pat. No. 5,091,869 discloses a computer integrated floor plan system and U.S. Pat. No. 6,006,021 discloses a device for mapping dwellings and other structures in three-dimension. However, both of these prior art patents disclose extremely complex systems requiring G.P.S., radar and/or complicated computer programs. None of such prior art discloses a simple, small, handheld, portable device which can be located in a room interior to simply and conveniently measure the length of a transverse wall in a matter of seconds so that measurements of numerous interior wall lengths can be accomplished within a few minutes. Clearly, a need still exists for such a device.

SUMMARY OF THE INVENTION

The present invention meets the aforementioned need in all respects. A preferred embodiment comprises a simple-to-operate, small, portable, handheld apparatus that is positioned at a location remote from a wall, the length of which is to be measured. The preferred embodiment is implemented using two laser-based pointer devices connected on a common housing through a shaft encoder. Each pointer device has a laser transmitter and detector for determining the distance to selected points at opposite ends of a wall. The angle between the pointers is determined by a shaft encoder as one of the two pointers is rotated from pointing at a first edge of the wall to the point at the second edge while the other of the pointers remains directed toward the first edge. The respective distances to the first and second edges are measured simultaneously. These respective distances and the angle between the pointers provide sufficient data to permit a microprocessor to calculate the distance between the wall edges, thus the length of the wall. Of course, it will be understood that the pointer targets can be selected to measure length in any direction, i.e., horizontally, vertically, diagonally, et cetera. Thus, for example, the same apparatus may be used to measure the height of a wall between a floor and a ceiling or the length of a floor or ceiling between two vertical walls.

In a second embodiment of the invention, only one laser-based pointer device is required. The pointer is first used to determine the distance to one edge of the wall or other surface and is subsequently used to determine the distance to another edge of the wall or other surface. This second embodiment preferably comprises a reference base such as a suction bell which stabilizes the device on an underlying surface (i.e., floor) so that rotation of the single pointer may be accomplished accurately between the two distance measurements. A shaft encoder again provides a measurement of the angle through which the pointer is rotated. The second embodiment is also provided with an articulatable member to orient the axis of the shaft encoder in any desired direction while the reference base remains fixed on the underlying surface.

A third embodiment of the invention is a hybrid of the first two embodiments. This embodiment also uses two pointer devices as in the first embodiment. However, one such pointer device has no receiver function and acts only to pinpoint a location on a remote edge of the wall to be measured. The second pointer device, which does have a receiver, is used to measure both distances. First the two pointer devices are aligned and the corresponding distance measured. Then the moveable pointer (with the receiver) is rotated while keeping the fixed pointer device directed at the first measuring point. The included angle and second point distance are then measured. This embodiment thus employs the two pointer devices of the first embodiment, but by making the measurement in a two-step sequential process, one pointer need not provide a receiving function.

OBJECTS OF THE INVENTION

It is therefore a principal object of the present invention to provide an electronic wall length measuring apparatus which is used at a distance from the wall to be measured.

It is another object of the invention to provide an electronic length measuring apparatus implemented in a handheld, portable configuration which is held at a location remote from a surface, the length of which is to be measured.

It is still another object of the invention to provide a length measuring apparatus which calculates length of a transverse wall by electronically measuring the distances to opposing edges of the wall and the angle between the paths corresponding to such distances.

It is yet another object of the invention to provide a method for measuring the distance between two remote points by measuring the distance to each such point and the included angle and then calculating the distance between the two points.

BRIEF DESCRIPTION OF THE DRAWINGS

The aforementioned objects and advantages of the present invention, as well as additional objects and advantages thereof, will be more fully understood hereinafter as a result of a detailed description of preferred embodiments when taken in conjunction with the following drawings in which.

DETAILED DESCRIPTION OF THE INVENTION

Figure 1:
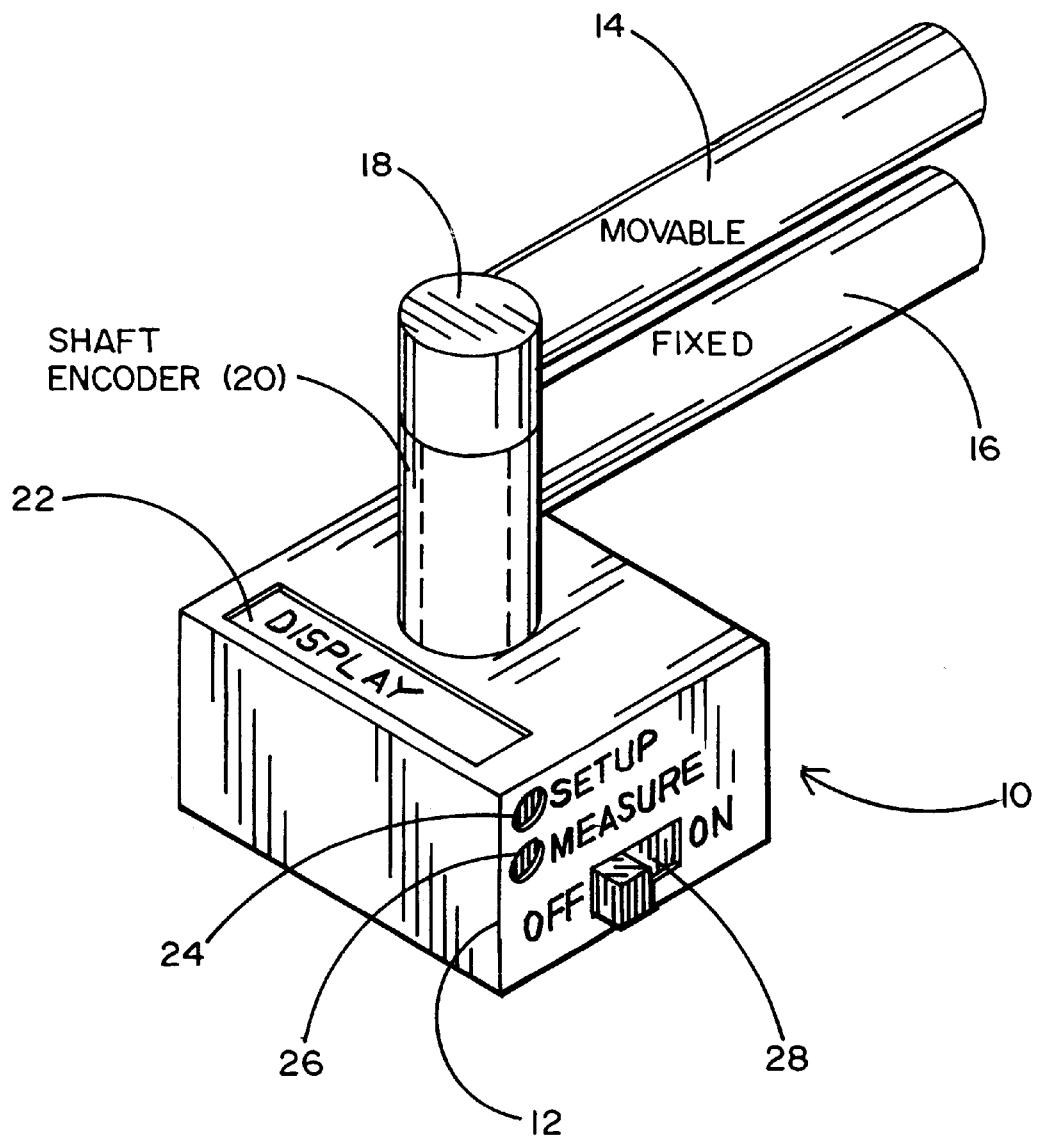
FIG. 1 is a three-dimensional exterior view of a preferred embodiment of the invention.

Referring to the accompanying drawings, it will be seen that an electronic measuring apparatus 10 comprises a housing 12 and two laser-based pointing devices 14 and 16. The pointing devices are connected through a common shaft assembly 18 to a shaft encoder mounted on housing 12. Pointing device 14 is moveable around shaft assembly 18 while pointing device 16 is preferably fixed. An LCD or equivalent display 22 is mounted on the surface of housing 12, as is a "setup" switch 24, a "measure" switch 26 and an "on/off" switch 28.

Figure 2:
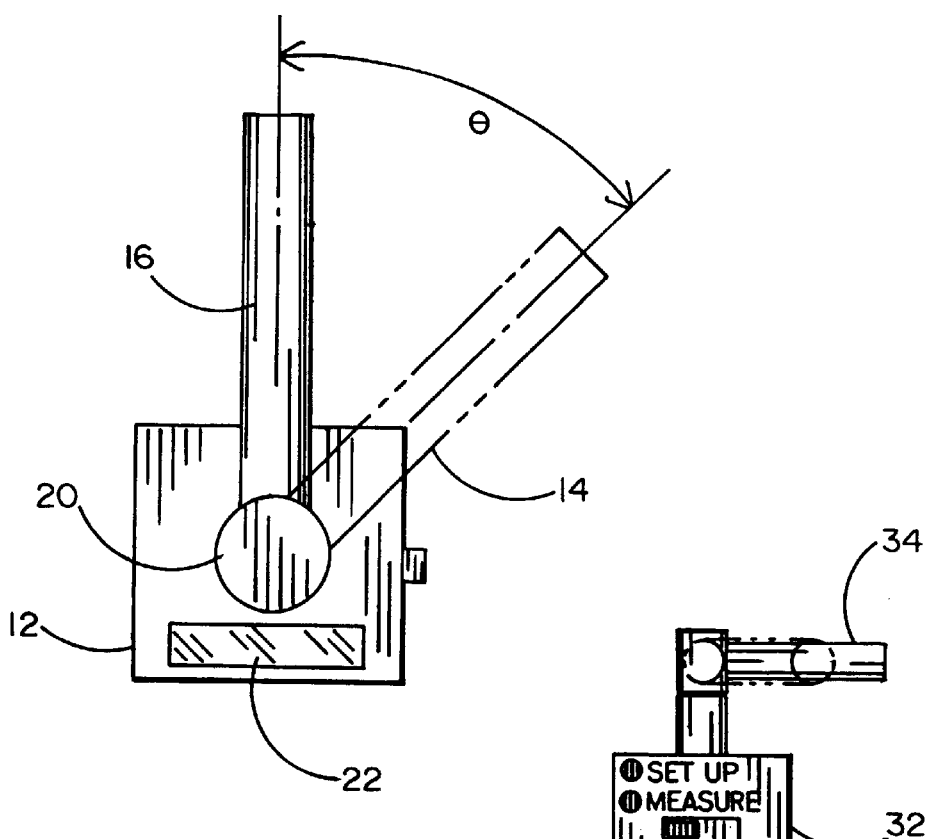
FIG. 2 is a top view of the preferred embodiment.

As shown best in FIG. 2, in operation, the moveable pointing device 14 is rotated through an angle θ to point at one edge of a target surface such as an interior wall. The fixed pointing device 16 meanwhile, is pointed at the opposing edge of the target surface by movement of the entire housing 12. During this portion of the operation of apparatus 10, the "setup" switch is depressed to provide continuous illumination from both pointing devices so that a user can observe an image of reflected light at each edge and be confident that the pointing devices 14 and 16 are pointed at the respective edges simultaneously. At this point, the user releases the "setup" switch and depresses the "measure" switch which causes simultaneous measurement of the distances to the respective edges and the angle θ between the devices 14 and 16 as recorded by the shaft encoder 20.

Figure 4:
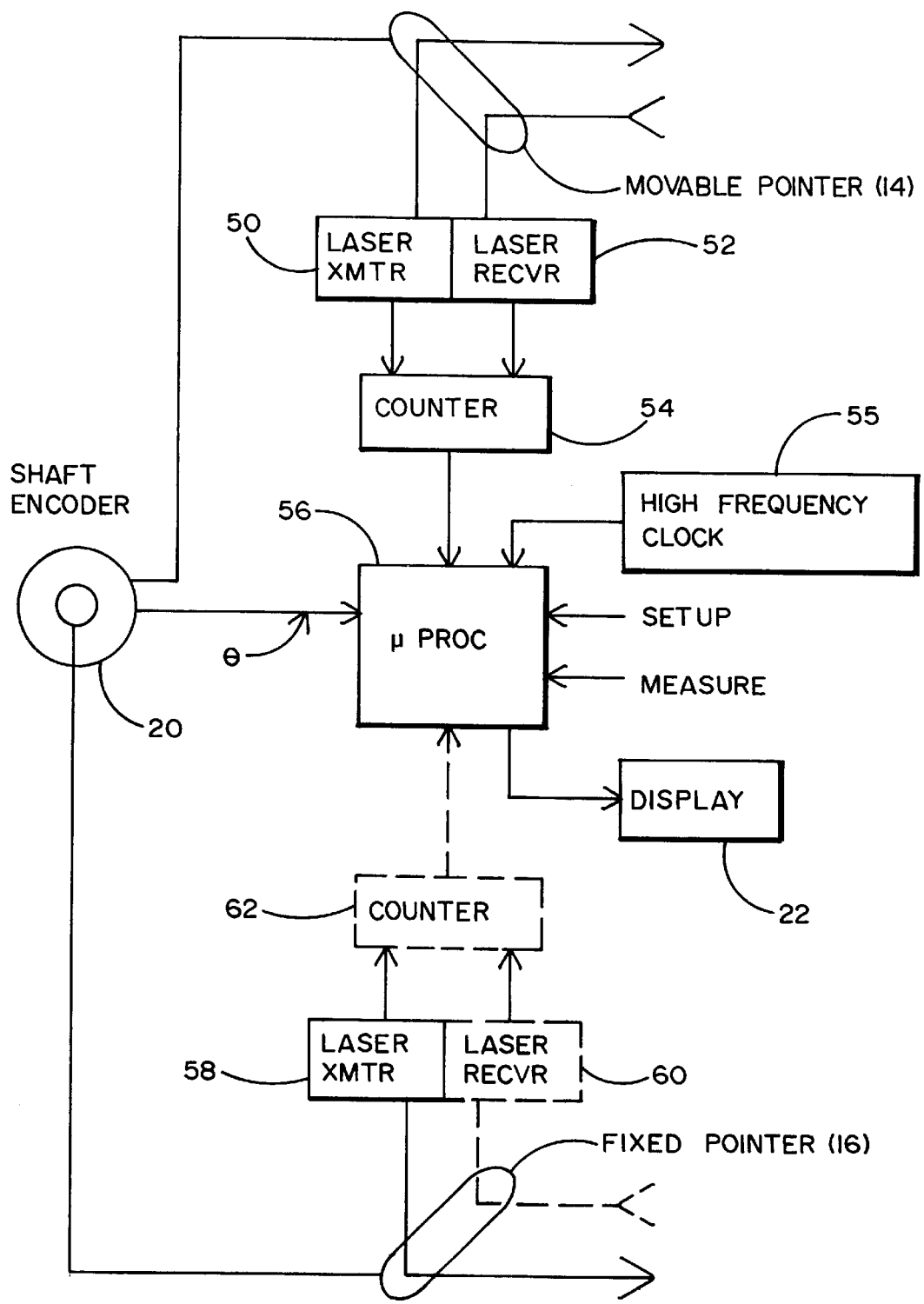
FIG. 4 is a block diagram representation of the preferred embodiment.

As seen in FIG. 4, each pointing device 14 and 16, is associated with respective laser transmitters 50 and 58, and with respective laser receivers 52 and 60. Respective transmitters and receivers are connected to respective high frequency counters 54 and 62 which are, in turn, connected to a microprocessor 56. Microprocessor 56 receives an input from shaft encoder 20 and provides an output to display 22.

A high frequency clock 55 provides sub-Nanosecond pulses for accurate measurement of distance. The operation of the microprocessor, counters, transmitters and receivers to measure distances, is substantially identical to the disclosed circuits of U.S. Pat. No. 5,652,651 the content of which is incorporated herein by reference. The included angle θ is, of course, a unique feature of the present invention which is used in the calculation of the distance between remote points as will be seen hereinafter. Moreover, the measured distances in the preferred embodiments of the invention are significantly shorter than the golf course-oriented measuring range of the apparatus disclosed in U.S. Pat. No. 5,652,651. However, the differences in regard to distance measurement are within the ordinary skill of those in the electronic arts, it being well-known that for shorter distances one uses shorter timing cycles higher frequencies and narrower pulses on the order of one-tenth of a nanosecond in width.

Figure 3:
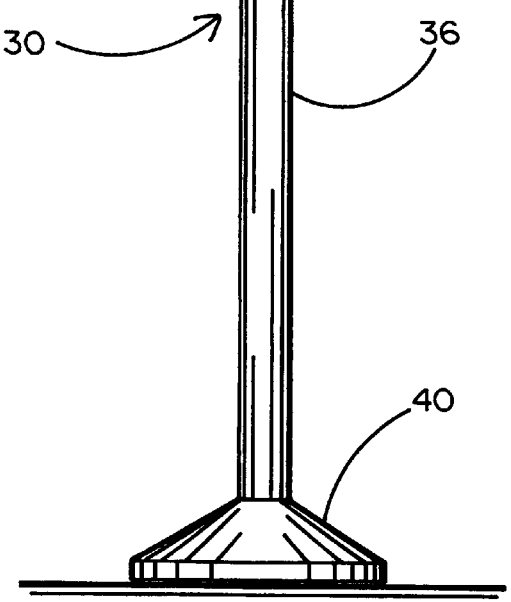
FIG. 3 is an elevational view of an alternative embodiment.

FIG. 3 illustrates a second embodiment of the invention which employs only one pointing device. An apparatus 30 has a housing 32, a laser-based pointing device 34, a stabilizing base 40 supporting an interconnecting rod 36 (which may be telescoping) and an articulatable joint 38. In this second embodiment, the one laser-based pointing device is used to measure the distance to both remote points in two sequential operations. The pointing device is first pointed toward one edge of a remote wall. The setup mode is used to accurately direct the pointing device 34 at the first edge. The first distance measurement is then made in the measure mode. Then the pointing device is rotated through an angle until it points at the opposing edge of the remote wall. It is accurately positioned in the setup mode while the housing 32 remains absolutely stable, thereby preserving the accuracy of the angle between the first and second pointing directions. The second distance is then measured in the measure mode. The measuring operation is then completed and the distance between the edge or the length of the wall is displayed.

The housing 32 may be optionally stabilized by base 40 through rod 36 so that the direction of the first measurement may be accurately preserved while the pointing device is redirected for the second measurement. Joint 38 permits selective inclination of the housing while rod 36 and base 40 remain in a fixed position on the underlying surface.

In yet a third embodiment, two pointing devices are used as in the first embodiment. However, only one of the two pointing devices has both transmit and receive capability. The other pointing device has only transmit capability and is used only as a reference pointer. In operation, both pointers are directed toward a first edge of a remote wall. When both pointers are aligned with that edge in setup mode, the first distance is measured in the measure mode. Then the dual function pointer is redirected to the opposing edge while the reference pointer remains directed to the first edge. The dual function pointer is carefully pointed at the second edge in setup mode while the reference pointer is simultaneously pointed at the first edge. Then the second distance is measured in the measure mode. The third embodiment thus involves sequential measurement operation of the second embodiment, but without the need for a stabilizing base. Moreover, in the block diagram of FIG. 4, dotted lines represent portions of the first embodiment which are omitted in the third embodiment because the fixed pointer is only a reference pointer not requiring a laser receiver or a counter.

Figure 5:
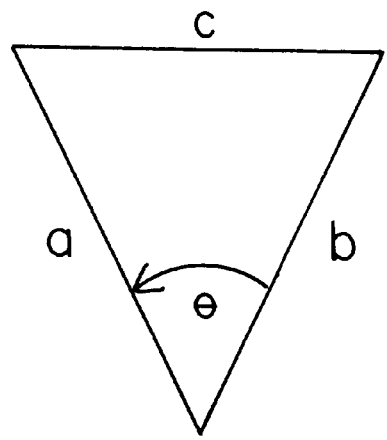
FIG. 5 is a mathematical diagram illustrating a method for calculating the distance between two remote points based upon the known distance to each point and the included angle.

FIG. 5 illustrates the calculation of a length C of a triangle based upon determining length A and B and the included angle θ. The solution, based upon equations (1) and (2), is known as the Law of Cosines wherein the sign of the Cosine term depends on whether θ is less than or greater than 90 degrees.

Having thus disclosed preferred embodiments of the invention, it being understood that numerous modifications and additions are contemplated and will now be apparent to those having the benefit of the above disclosure, what is claimed is:

1. An apparatus for measuring the distance between two remote points, the apparatus comprising:

at least one laser-based device for electronically determining by laser light reflection the respective distances to said remote points;

an angle indicating device for determining the included angle between said respective distances;

and a display for displaying said distance between said two remote points which is computed using the law of cosines.

2. The apparatus recited in claim 1 wherein said angle indicating device comprises a shaft encoder.

3. The apparatus recited in claim 1 wherein said laser-based device is rotatable through an angle and is attached to said angle indicating device for registering the angle between first and second positions of said laser-based device, said first position corresponding to one of said remote points, said second position corresponding to the other of said remote points.

4. The apparatus recited in claim 1 comprising at least two said laser-based devices, a first of said laser-based devices measuring a distance to one of said remote points and a second of said laser-based devices measuring a distance to the other of said remote points.

5. The apparatus recited in claim 4 wherein said at least two laser-based devices are configured for simultaneous measurement of respective distances to said remote points.

6. The apparatus recited in claim 1 comprising at least two said laser-based devices, a first of said laser-based devices being used sequentially to measure respective distances to said remote points, a second of said laser-based devices providing a reference image at one of said remote points.

7. The apparatus recited in claim 1 further comprising means for stabilizing said apparatus on an underlying surface.

8. The apparatus recited in claim 1 wherein said trigonometric calculation is based upon the law of cosines relating to calculating a length of a side of a triangle knowing lengths of the remaining two sides and their included angle.

9. The apparatus recited in claim 1 wherein said two remote points are on opposed edges of a remote interior wall and wherein a distance between said two remote points is a linear dimension of said wall between said opposed edges.

10. The apparatus recited in claim 1 wherein a distance between said two remote points is less than 100 feet.

11. An electronic length measuring apparatus for determining linear dimension between two remote points on a remote surface, the apparatus comprising:

at least one laser-based pointer for electronically determining by laser light reflection the respective distances to said two remote points;

an angle indicating device for determining the included angle between said respective distances;

and a display for displaying said distance between said two remote points which is computed using the law of cosines.

12. The apparatus recited in claim 11 wherein said angle indicating device comprises a shaft encoder.

13. The apparatus recited in claim 11 wherein said laser-based device is rotatable through an angle and is attached to said angle indicating device for registering the angle between first and second positions of said laser-based device pointer, said first direction corresponding to one of said points and said second direction corresponding to the other of said points.

14. The apparatus recited in claim 11 comprising at least two said light-based devices, a first of said light-based devices measuring a distance to one of said points and a second of said light-based devices measuring a distance to the other of said points.

15. The apparatus recited in claim 14 wherein said at least two light-based devices are configured for simultaneous measurement of respective distances to said points.

16. The apparatus recited in claim 11 comprising at least two said light-based devices, a first of said light-based devices being used sequentially to measure respective distances to said points, a second of said light-based devices providing a reference image at one of said points.

17. The apparatus recited in claim 11 further comprising means for stabilizing said apparatus on an underlying surface.

18. The apparatus recited in claim 11 wherein said calculation is based upon the law of cosines relating to calculating a length of a side of a triangle knowing lengths of the remaining two sides and their included angle.

19. The apparatus recited in claim 11 wherein said two points are on opposed edges of a remote interior wall and wherein a distance between said two points is a linear dimension of said wall between said opposed edges.

20. The apparatus recited in claim 11 wherein a distance between said two points is less than 100 feet.

21. A method for determining the distance between two remote points, the method comprising the following steps:

a) electronically measuring the distance from a measuring location to a first one of said two remote points by laser light reflection, b) electronically measuring the distance from said measuring location to a second one of said two remote points by laser light reflection;

c) electronically measuring the angle included between said measuring location and said two remote points;

d) calculating said distance between said two remote points based upon the measurements made in steps a), b) and c) and the law of cosines.

* * * * *